United States Patent

Meier-Burkamp et al.

[11] Patent Number: 5,916,329
[45] Date of Patent: Jun. 29, 1999

[54] CASING FOR AN OPERATING PULL FOR SHIFTING THE GEAR LEVELS OF A BICYCLE GEAR

[75] Inventors: Gerhard Meier-Burkamp, Bergrheinfeld; Karl-Joachim Kühne, Niederwerrn; Alois Karch, Oerlenbach; Ulrike Bodmer, Schweinfurt, all of Germany

[73] Assignee: Fichtel & Sachs AG, Schweinfurt, Germany

[21] Appl. No.: 08/850,088

[22] Filed: May 2, 1997

[30] Foreign Application Priority Data

May 3, 1996 [DE] Germany ............ 296 08 010 U

[51] Int. Cl.$^6$ ............................................ F16C 1/10
[52] U.S. Cl. ........................... 74/502.2; 74/500.5
[58] Field of Search ................. 74/500.5, 501.5 R, 74/501.6, 502.2; 474/80

[56] References Cited

U.S. PATENT DOCUMENTS 4,052,914  10/1977  Nakajima .
5,392,668   2/1995  Nurnberger ............... 74/501.5 R X

FOREIGN PATENT DOCUMENTS 0661204  7/1995  European Pat. Off. .
3203197  8/1983  Germany .
4142867  7/1992  Germany .
 473092  7/1952  Italy ............................... 474/80

Primary Examiner—Charles A. Marmor
Assistant Examiner—MaryAnn Battista
Attorney, Agent, or Firm—Nils H. Ljungman & Associates

[57] ABSTRACT

A casing for accommodating an operating pull for the purpose of attaching the operating pull to a bicycle gear, especially to a multiple-gear hub with a shifting wheel. The shifting wheel is placed, coaxially to the hub axis, at one of the ends of the hub. The shifting wheel is in contact with a control device that can be operated by the bicyclist during operation of the bicycle. The control device can include a remote-handling device that can be used by the bicyclist. The remote-handling device has a cable pull and a cable cover. The cable cover supports itself on the casing extension by an adjusting screw. The casing has a drive casing, for covering the shifting wheel, and a tubular casing extension, for accommodating the cable pull and an operating pull. The drive casing is connected to the casing extension by a joint with a cable guide. A spring storage and a coupling can be accommodated in the casing extension.

20 Claims, 3 Drawing Sheets

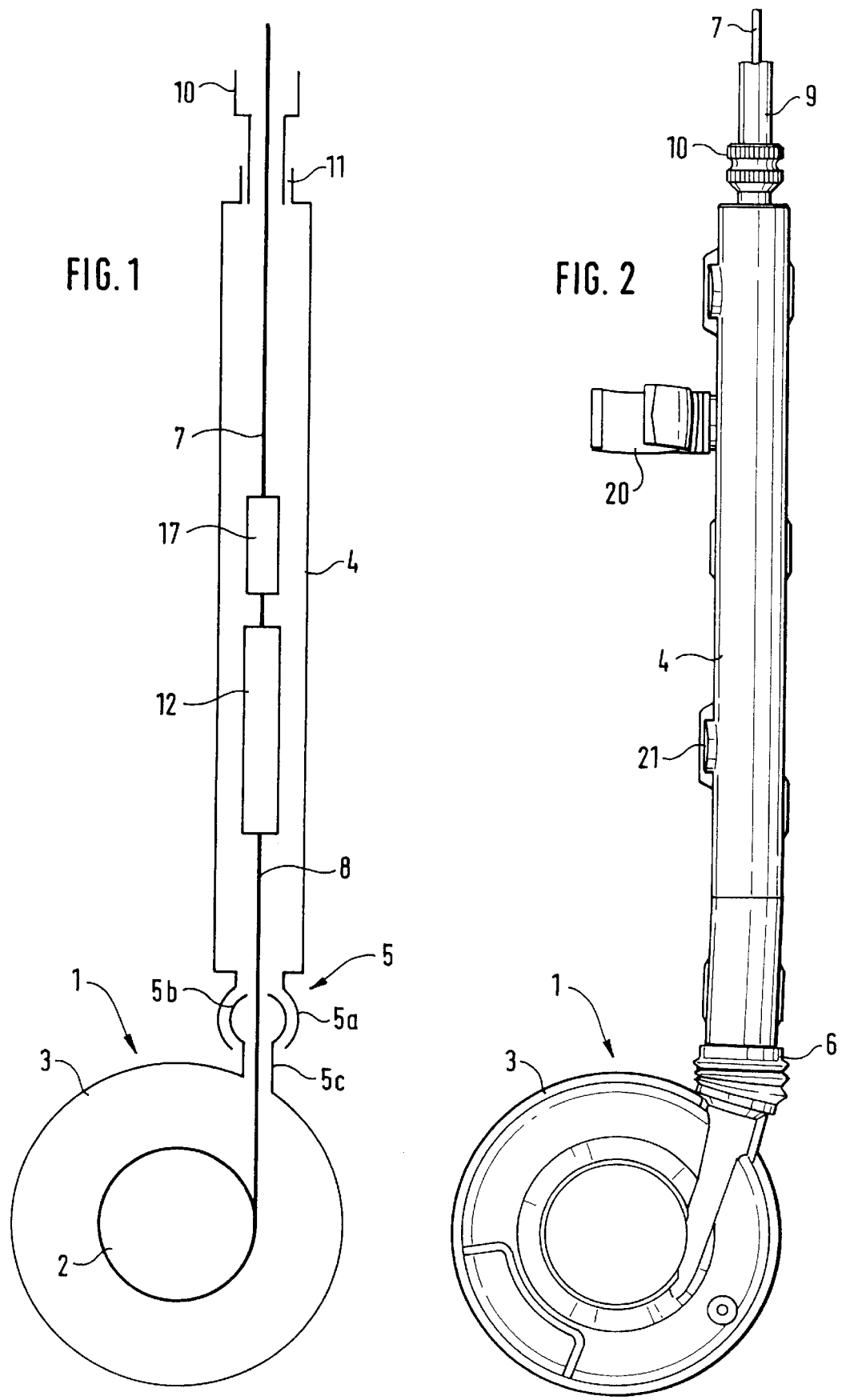

CASING FOR AN OPERATING PULL FOR SHIFTING THE GEAR LEVELS OF A BICYCLE GEAR

BACKGROUND OF THE INVENTION

1. Field of the Invention

The present invention relates generally to a casing for an operating pull. Wherein, the operating pull has the purpose of shifting the gear levels of a bicycle gear, especially a bicycle hub with a shifting wheel. The shifting wheel is placed, coaxially to the hub axis, at one of the ends of the hub. The shifting wheel is in contact with a control organ that can be operated, by means of a remote-handling device, by the bicyclist during the ride. The remote-handling device, by means of a bowden cable, includes a cable pull and a cable cover. The cable cover supports itself, by means of an adjusting screw, on the casing extension.

2. Background Information

According to German Patent No. 41 42 867 A1, a closed device with several rotational speed levels for use with a bicycle is shown. The device's drive component contains a shifting component that is placed on a shaft, which is unable to turn. The shifting component contains a shifting cable catch for catching a nipple of a shifting cable. Generally, such a shifting cable is operated, by means of a handle, by the bicyclist and runs in the form of a bowden cable in the inside of a shifting cable cover to the shifting cable catch. The shifting cable cover must be, in a fixed position, held up in front of the shifting cable catch. Generally, a holding-up arm for the cable cover is attached to the chain brace of the bicycle's frame. The holding-up arm can also be a lever which is connected to the fixed shaft and shows at its end a holding-up arm. However, all conceivable solutions are not suitable to encompass, in addition to the function of holding up the sheath, a covering to prevent the penetration of dirt, and moreover the accommodation of a spring storage in the shifting cable for the purpose of bridging temporary shifting resistances.

OBJECT OF THE INVENTION

The object of the present invention is to create a low-cost casing, suitable to prevent the penetration of dirt and for accommodating a shifting pull that operates a shifting wheel on gear hubs. A further object of the present invention is to create a casing, suitable to hold up a cable cover that surrounds the shifting pull and to accommodate a spring storage for bridging temporary shifting thrusts in the shifting cable. In addition, another object of the present invention is to create a casing attachable to bicycle frames of any shape or form.

SUMMARY OF THE INVENTION

The present invention teaches that this object can be accomplished in accordance with at least one possible embodiment, by an arrangement in which a shifting wheel can be placed, coaxially to the hub axis, at one of the ends of the hub. The shifting wheel can be in contact with a control organ that can be operated by means of a remote-handling device controlled by the bicyclist during the ride. The remote-handling device, by means of a bowden cable, can include a cable pull and a cable cover. The cable cover can support itself, by means of an adjusting screw on the casing extension. The casing can have a drive casing, for covering the shifting wheel. The casing can also have a tubular casing extension, for accommodating the cable pull and an operating pull. The drive casing is preferably connected to the casing extension by a joint with a cable guide. A spring storage and a coupling can be accommodated in the casing extension.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein:

FIG. 1 shows a casing made up of a drive casing and a casing extension, around a shifting wheel and a shifting pull;

FIG. 2 shows a drawing of the casing pursuant to FIG. 1;

DESCRIPTION OF THE PREFERRED EMBODIMENT

Figure 1A:
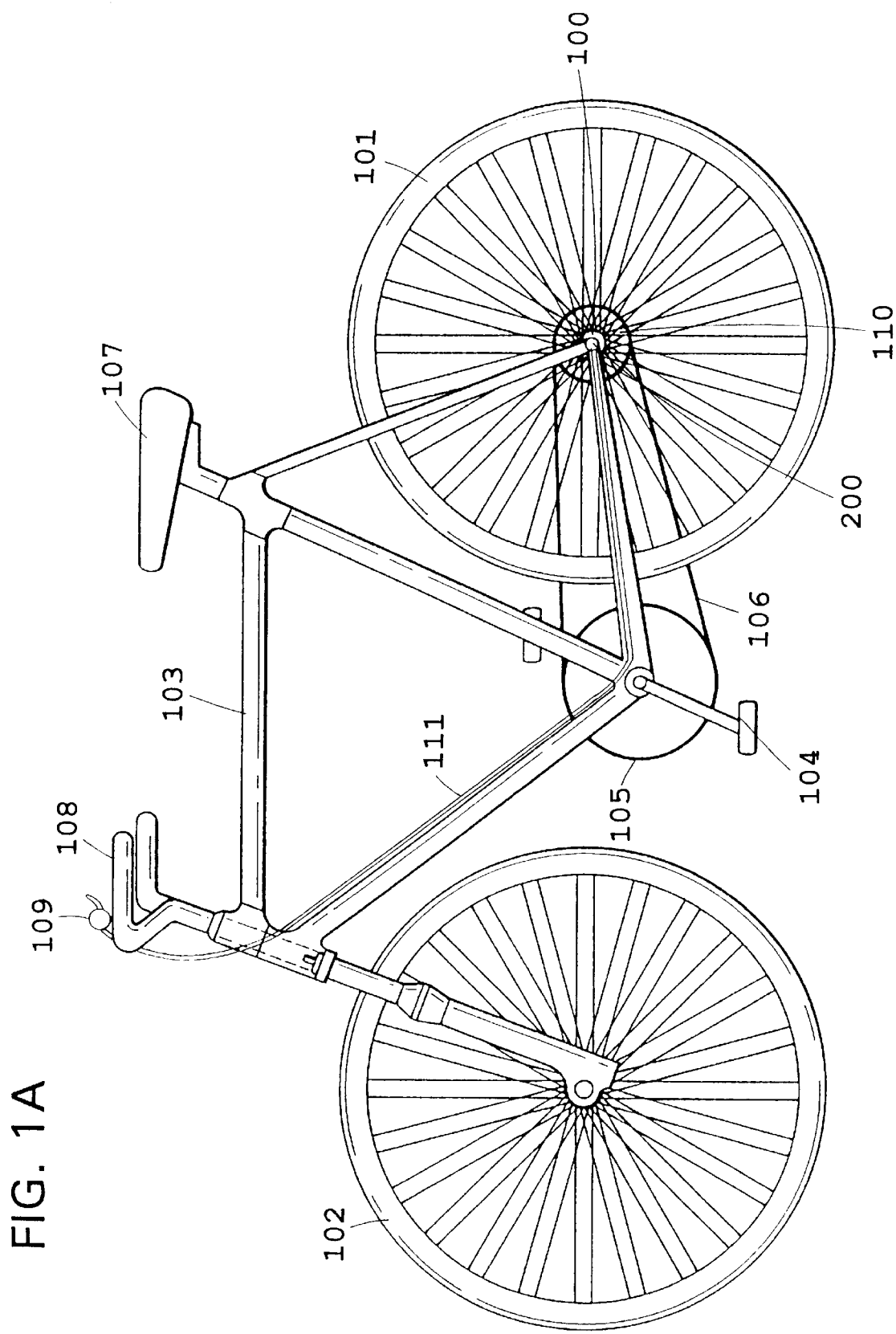
FIG. 1A generally shows a bicycle and components thereof.

A bicycle having a multi-speed hub 100 on a rear wheel 101 thereof is generally depicted in FIG. 1A. The hub 100 can have a hub axle 200, by means of which the hub 100 can be attached to a frame 103 of the bicycle. The frame 103 can also preferably support a front wheel 102. A chain 106 and pedal system 104, 105 can preferably be provided to transmit a drive power to the hub 100 and the rear wheel 101. The pedals 104 are preferably attached to a drive sprocket 105, the outside of which sprocket 105 preferably engages the chain 106. The chain 106 is also preferably engaged about the hub 100 by means of an additional drive sprocket 110. In addition to the above, a seat 107 can preferably be provided for the rider, while handlebars 108 can be provided for steering purposes. On the handlebars 108 there can also preferably be a gear shifting device 109 for shifting the gears of the multi-speed hub 100. The shifting device 109 can preferably be operatively connected to the hub 100 by means of cables 111 that are fastened along the frame 103 of the bicycle and preferably extend from the shifting device 109 to the hub 100. Such cables 111 and shifting devices 109 are typically well known and are therefore not discussed in any further detail herein.

A casing 1 for a shifting or operating pull 7 for the purpose of shifting the gear levels of a gear hub 100 for a bicycle is shown in FIG. 1. The casing 1 can include a drive casing 3 and a casing extension 4. The drive casing 3 can preferably be placed around a shifting wheel 2 of the gear hub 100 and fixed there. The casing extension 4 can be connected, in a movable manner, to the drive casing 3 by a joint 5. A cable pull 8 attached to the shifting wheel 2, can be in contact with a spring storage 12 by a cable guide 5c. The spring storage 12 can be accommodated, together with a coupling 17, in the casing extension 4. With the coupling 17, the shifting pull 7 can be connected to the spring storage 12 and thus to the cable pull 8 by means of a clamping device 18 (see FIG. 3) and a clamping screw 19 (see FIG. 3), with which a mechanical control line is established to a hand actuator attachment or shifting device 109 on the handlebars 108 for the rider of the bicycle. The shifting pull 7 can leave the casing extension 4 by an adjusting screw 10 in a thread 11. A cable cover 9 (see FIG. 2) supports itself on the adjusting screw 10. The adjusting screw 10, intended as the holding-up arm for the cable cover 9, can be adjusted by turning in the thread 11 in such a way that the length of the shifting pull 7 can be adjustable relative to the cable cover 9.

In other words and in accordance with another possible embodiment, the cable pull or cable line 8 can be attached to the shifting wheel or indexing wheel 2. The cable line B can then preferably pass through the cable guide 5c of the joint 5. After the cable line 8 passes through the cable guide 5c, the cable line 8 is preferably connected to the spring storage or spring reservoir 12. The operating pull or control line 7 can be attached to the spring reservoir 12 by a coupling 17. The control line 7 can be connected to the coupling 17 by inserting the control line 7 into the clamping device 18. The clamping screw 19 can then be used to tighten the control line 7 in the clamping device 18. The coupling 17 and the spring reservoir 12 are preferably placed inside the casing extension or housing 4. The control line 7 is preferably connected to a remote-handling device, hand actuator attachment or control device 109 on the handlebars 108.

The joint 5 between the drive casing 3 and the casing extension 4 is preferably designed as a ball-and-socket joint with an outer bearing shell 5a and an inner bearing shell 5b. The shifting pull 7 on the bicycle can be placed in such a way, e.g., on a chain brace of the rear structure of the bicycle frame, that upon assembling the hub 100, the drive casing 3 can already be roughly fixed. By employing certain equalizing maneuvers by the joint 5, the casing extension 4 can adjust itself, after attaching the shifting pull 7, in its direction of traction.

In another possible embodiment of the present invention, the joint 5 can also be a ball joint or any other type of joint that can permit some movement between the drive casing 3 and the casing extension 4. The drive casing or housing 3 is preferably fixed into a position upon assembly of the hub 100. Since the casing extension 4 is preferably attached to the drive casing 3 by the joint 5, any adjustment in the position of the casing extension 4 will preferably occur due to a change in the size or configuration of the joint 5. The casing extension 4 may require an adjustment after the shifting pull or control line 7 is attached to the coupling 17 in the casing extension 4.

Figure 4:
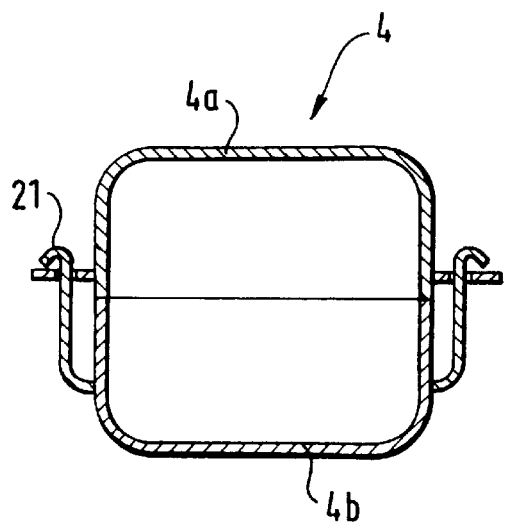
FIG. 4 shows the casing extension, having a first and a second casing shell.

To prevent dirt from penetrating into the area of the joint 5, a collar 6 (see FIG. 2) can be provided. The collar 6 can embrace the outlet of the drive casing 3 as well as the inlet of the casing extension 4. As illustrated in FIG. 4, the casing extension 4, for production-engineering reasons, can have a first casing shell 4a and a second casing shell 4b that are preferably held together by at least one positive-fit connection 21. It is beneficial that the collar 6 helps to hold the first casing shell 4a and the second casing shell 4b together and to seal them. The fact that all casing components 3, 4a, and 4b are preferably made of plastic can be regarded as another advantage. The production methods of plastic allow a wide variety of possible designs.

Figure 3:
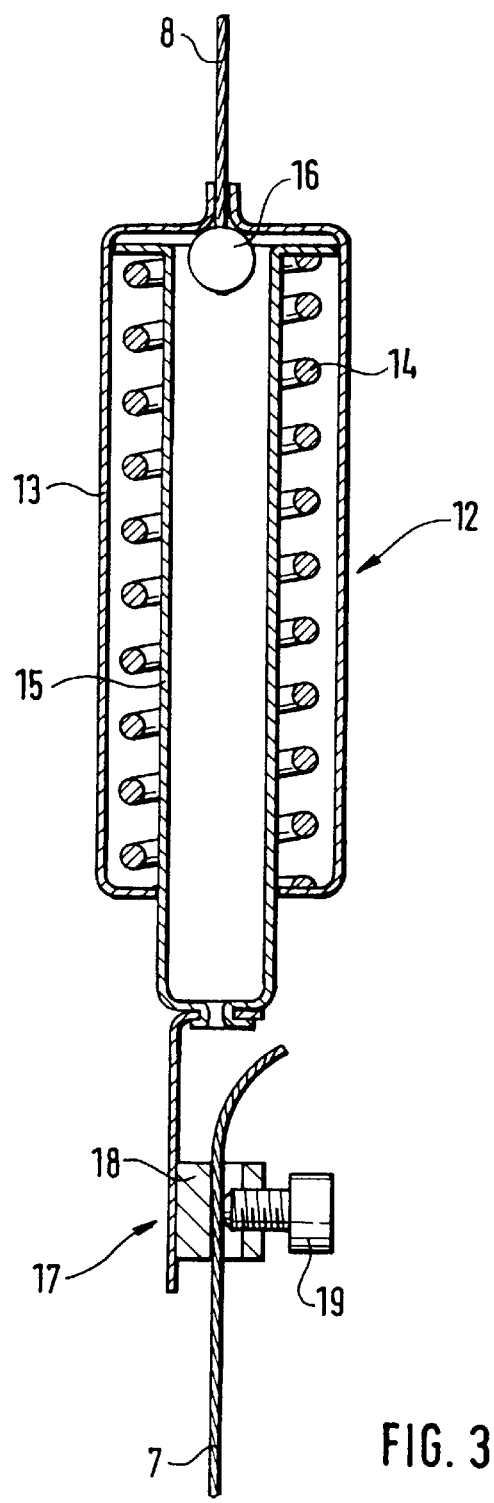
FIG. 3 shows a spring storage with a coupling placed in the casing.

As mentioned earlier, the casing extension 4 can accommodate the cable pull 8, the spring storage 12 with the coupling 17, and the shifting pull 7 connected to the coupling 17. As illustrated in FIG. 3, the spring storage 12 can include an outer tube 13, which is connected to the cable pull 8 by a nipple 16, a spring 14, and an inner tube 15. The inner tube 15 can be in contact with the clamping device 18 of the coupling 17. When shifting, a traction force is directed to the spring storage 12 by the shifting pull 7, the force is then directly passed on to the cable pull 8 which moves the shifting wheel 2. In case of shifting resistances within the gear hub 100, it may be possible that the shifting wheel 2 is temporarily blocked, the shifting pull 7, however, is operated by the bicyclist. In this case, the inner tube 15 and the outer tube 13 move against one another and preload the spring 14 until the resistance in the gear hub 100 is cleared and the shifting wheel 2 can conform to the motion of the cable pull 8. Upon relaxing the spring 14, the shifting into the desired gear is initiated with a time delay.

In other words and in accordance with one possible embodiment of the present invention, a shifting of the gears of the multigear hub 100 can begin by the bicyclist operating the control device 109. The control device 109 can then cause the shifting pull 7 to exert a force on the spring storage 12. The spring storage 12 preferably transfers this force to the cable pull 8. The force on the cable pull 8 can cause the shifting wheel 2 to change the gear in the multigear hub 100. However, if the multigear hub 100 is temporarily unable to shift, in the event of unforeseen circumstances, the spring storage 12 will store the force from the control device 109 until the cable pull 8 and shifting wheel 2 can execute a shift of the multigear hub 100.

In FIG. 4 it is illustrated as to how the casing extension 4 can be formed by the first casing shell 4a and the second casing shell 4b. Two positive-fit connections 21 can capture the casing shells 4a and 4b in their reciprocal position. An attachment 20 (see FIG. 2) can be placed on one of the two casing shells 4a or 4b. The casing extension 4 can be attached to a brace of the rear structure of the bicycle by the attachment 20 in order to avoid rattling noises.

In accordance with one possible embodiment of the present invention, the outer bearing shell 5a can be formed out of projections extending from the first casing shell 4a and the second casing shell 4b. The inner bearing shell 5b can be formed out of a projection extending from said drive casing 3. The outer bearing shell 5a can be designed to at least partially enclose said inner bearing shell 5b.

In one possible embodiment of the present invention, the drive casing 3 can at least partially, and possibly entirely, cover the shifting wheel 2. The collar 6 can at least partially, and possibly entirely, cover the joint 5. The respective portions of the shifting wheel 2 and the joint 5 covered by the drive casing 3 and the collar 6 can preferably be the areas that are most susceptible to damage from dirt.

In another possible embodiment of the present invention, the casing 1 could be used with a shifting apparatus different from the shifting wheel 2. A variety of shifting apparatuses, including designs with cams and push rods, could be protected by the drive casing 3. The other shifting apparatuses can preferably take advantage of the ability of the spring storage 12 to store a force from the control device 109 until the shifting apparatus can change the gear of the multigear hub 100.

In yet another possible embodiment of the present invention, the casing 1 could possibly be used with a derailleur arrangement for a bicycle. The spring storage 12 could be used to store a force until the derailleur would be able to complete a gear shift. The casing extension 4 and the joint 5 would be effective to prevent the penetration of dirt into the derailleur arrangement.

In a further possible embodiment of the present invention, the cable 111 from the remote handling device 109 to the casing extension 4 is preferably a bowden cable. However, other types of cables may also be used between the remote handling device 109 and the coupling 17.

In one possible embodiment of the present invention, the spring storage 12 can be replaced by another energy storing device. The energy storing device would need to fit inside the casing extension 4. The energy storing device should also be able to connect to the cable pull 8 and the operating pull 7. The energy storing device can preferably be used to store a shifting force until the shifting wheel 2 can effect a gear change in the multigear hub 100.

One feature of the invention resides broadly in the casing 1 for accommodating an operating pull 7 for the purpose of attaching it to a bicycle gear, especially to a multiple-gear hub in the rear wheel with a shifting wheel 2 which is placed, coaxially to the hub axis, at one of the ends of the hub and which is in contact with a control organ that can be operated, by means of a remote-handling device, by the bicyclist during the ride, whereby the remote-handling device is, by means of a bowden cable, consisting of a cable pull 8 and a cable cover 9, which supports itself, by means of an adjusting screw 10, on the casing extension 4, distinguished in that the casing 1 shows a drive casing 3, for covering the shifting wheel 2, and a tubular casing extension 4, for accommodating the cable pull 8 and an operating pull 7, whereby the drive casing 3 is connected to the casing extension 4 by a joint 5 with a cable guide 5c, while a spring storage 12 and a coupling 17 can be accommodated in the casing extension 4.

Another feature of the invention resides broadly in the casing distinguished in that the casing extension 4 consists of a first casing shell 4a and a second casing shell 4b, whereby the casing shells 4a, 4b are connected to each other by at least one positive-fit connection 21.

Yet another feature of the invention resides broadly in the casing distinguished in that the first casing shell 4a and the second casing shell 4b form with their ends an outer bearing shell 5a which encloses an inner bearing point 5b that is formed on the drive casing 3.

Still another feature of the invention resides broadly in the casing distinguished in that the joint 5 is covered by a collar 6.

A further feature of the invention resides broadly in the casing distinguished in that at least one of the components of the casing 1, namely the first casing shell 4a, the second casing shell 4b, as well as the drive casing 3 are made of plastic.

Types of transmissions for bicycles, and components thereof, which may be utilized in accordance with the embodiments of the present invention may be disclosed in the following U.S. Patents: U.S. Pat. No. 3,944,253, entitled "Infinitely Variable Transmission for Pedal-Driven Vehicles"; U.S. Pat. No. 4,973,297, entitled "Multispeed Drive Hub With More Than Three Speeds"; U.S. Pat. No. 4,721,015, entitled "Three Stage Planetary Driving Wheel for Pedal Powered Vehicles"; U.S. Pat. No. 4,063,469, entitled "Multiple Speed Hub for a Vehicle Wheel"; U.S. Pat. No. 4,727,965 to Zach et al.; U.S. Pat. No. 4,721,013 to Steuer et al.; U.S. Pat. No. 4,651,853 to Bergles et al.; U.S. Pat. No. 4,628,769 to Nagano; U.S. Pat. No. 4,400,999 to Steuer; and U.S. Pat. No. 5,273,500.

Examples of multi-speed hubs for bicycles which may possibly be utilized or adapted for use in the context of the present invention may be disclosed in the following patents: U.S. Pat. No. 5,556,354, entitled "Shifting Arrangement for a Change Gear Drive in Multispeed Hubs for Bicycles"; U.S. Pat. No. 5,540,456, entitled "Multispeed Hub for a Bicycle"; U.S. Pat. No. 5,527,230, entitled "Multi-Speed Hub for Bicycles"; and U.S. Pat. No. 5,443,279, entitled "Bicycle and Bicycle with Multispeed Wheel Hub".

Examples of bicycle shifting mechanisms which may be utilized in accordance with the embodiments of the present invention, may be disclosed in the following U.S. patents: U.S. Pat. No. 4,900,291, entitled "Bicycle Gear Shifting Method and Apparatus"; U.S. Pat. No. 4,938,733, entitled "Bicycle Gear Shifting Method and Apparatus"; U.S. Pat. No. 5,009,629, entitled "Shift Lever Assembly for Bicycle"; U.S. Pat. No. 5,102,372, entitled "Bicycle Derailleur Cable Actuating System"; U.S. Pat. No. 5,135,441, entitled "Shifting Apparatus for Multispeed Bicycles"; U.S. Pat. No. 5,178,033, entitled "Bicycle Gear Display"; U.S. Pat. No. 5,186,071, entitled "Bicycle Speed Change Lever Assembly"; U.S. Pat. No. 5,186,072, entitled "Bicycle Speed Control System for Controlling a Change Speed Devise Through a Change Speed Wire"; U.S. Pat. No. 5,191,807, entitled "Indexed Gear-Shift Mechanism"; U.S. Pat. No. 5,197,927, entitled "Bicycle Derailleur Cable Actuating System"; U.S. Pat. No. 5,205,794, entitled "Shift Mechanism for Bicycle"; U.S. Pat. No. 5,213,005, entitled "Speed Control Devise for Bicycle Derailleur"; U.S. Pat. No. 5,241,878, entitled "Bicycle Control Devise"; U.S. Pat. No. 5,287,766, entitled "Speed Control Apparatus for a Bicycle"; U.S. Pat. No. 5,303,608, entitled "Bicycle Speed Change Lever Assembly"; U.S. Pat. No. 5,315,891, entitled "Bicycle Speed Change Operation Assembly"; U.S. Pat. No. 5,322,487, entitled "Self-Contained Change Speed Apparatus with Shaped Pawls to Equalize a Shifting Force for a Bicycle"; U.S. Pat. No. 5,325,735, entitled "Bicycle Speed Control Apparatus Having a Speed Indicator"; U.S. Pat. No. 5,354,240, entitled "Variable Transmission"; U.S. Pat. No. 5,355,745, entitled "Bicycle Speed Controller"; and U.S. Pat. No. 5,361,645, entitled "Shift Lever Apparatus for Use in Bicycle".

Some examples of latching shifters which may be used in accordance with the embodiments of the present invention, may be disclosed in the following U.S. patents: U.S. Pat. No. 5,421,219 entitled "Bicycle Speed Change System, Bicycle Speed Change Method and Bicycle Speed Change Operation Assembly"; U.S. Pat. No. 5,390,565 entitled "Bicycle Speed Change System, Bicycle Speed Change Method and Bicycle Speed Change Operation Assembly"; U.S. Pat. No. 5,315,891 entitled "Bicycle Speed Change Operation Assembly"; and U.S. Pat. No. 5,241,877 entitled "Gear Selector".

Some examples of Twist grip shifters which may possibly be used in accordance with the embodiments of the present invention, may be disclosed in the following U.S. patents: U.S. Pat. No. 3,218,879 entitled "Twist Grip Controls"; U.S. Pat. No. 5,134,897 entitled "Twist-grip Device for Operating the Gears of a Bicycle"; U.S. Pat. No. 4,938,733 entitled "Bicycle Gear Shifting Method and Apparatus"; and U.S. Pat. No. 4,900,291 entitled "Bicycle Gear Shifting Method and Apparatus".

Some examples of ball and socket joints which could possibly be used or adapted for use in the context of the present invention could be disclosed in the following U.S. patents: U.S. Pat. Nos. 5,449,206; 5,409,320; 5,383,738; 5,380,114; 5,365,639 and 5,265,965.

Examples of covers for joints which may possibly be used or adapted for use in the context of the present invention may be disclosed in the following patents: U.S. Pat. No. 5,531,534, entitled "Protective Cover for a Ball Joint Assembly"; U.S. Pat. No. 5,484,218, entitled "Protective Cover for a Ball Joint Assembly"; and U.S. Pat. No. 5,413,431, entitled "Protective Cover for a Ball Joint Assembly".

Examples of cables which may possibly be used or adapted for use in the context of the present invention may be disclosed in the following patents: U.S. Pat. No. 5,394,768, entitled "Bicycle Cable"; U.S. Pat. No. 4,877,112, entitled "Bicycle Brake Cable Assembly"; U.S. Pat. No. 4,833,937, entitled "Adjusting Device for a Control Cable for a Bicycle"; U.S. Pat. No. 4,585,246, entitled "Bicycle Frame with Internal Cable"; and U.S. Pat. No. 4,177,541, entitled "Bicycle Cable".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A shifting arrangement for a multigear hub mounted on a rear axle of a bicycle, said shifting arrangement comprising:

a shifting device to shift gears;
   said shifting device comprising an arrangement to mount said shifting device;
   a control device to control the shifting of gears by said shifting device;
   said control device comprising an arrangement to mount said control device;
   a first casing;
   said first casing being configured and disposed to cover said shifting device;
   a second casing;
   said second casing being disposed adjacent to said first casing;
   said control device comprising a cable;
   said cable being disposed to extend from said control device to said second casing;
   said cable comprising a first pull;
   said first pull comprising a first end and a second end;
   said first end of said first pull being connected to said control device;
   said second end of said first pull being disposed within said second casing;
   said cable comprising a cover;
   said cover being disposed about said first pull;
   a second pull;
   said second pull comprising a first end and a second end;
   said first end of said second pull being connected to said shifting device;
   said second end of said second pull being disposed within said second casing;
   a connecting arrangement to connect said second end of said first pull to said second end of said second pull;
   said connecting arrangement being disposed within said second casing;
   a joint;
   said joint being configured and disposed to connect said first casing to said second casing;
   said joint comprising a portion; and
   said portion of said joint being configured and disposed to guide said second pull from said second casing into said first casing.

2. The shifting arrangement according to claim 1, wherein:

said connecting arrangement comprises a spring arrangement;
   said spring arrangement is disposed in said second casing; and
   said spring arrangement is configured and disposed to transmit a force from said control device to said shifting device.

3. The shifting arrangement according to claim 2, wherein:

said connecting arrangement comprises a coupling device; and
   said coupling device is configured and disposed to connect said second end of said first pull to said spring arrangement.

4. The shifting arrangement according to claim 3, wherein:

said shifting arrangement comprises a collar; and
   said collar is configured and disposed to at least partially cover said joint to prevent dirt from penetrating said joint.

5. The shifting arrangement according to claim 4, wherein:

said second casing comprises a first portion and a second portion;
   said first portion of said second casing is configured and disposed to form at least one connection with said second portion of said second casing; and
   said second portion of said second casing is configured and disposed to form at least one connection with said first portion of said second casing.

6. The shifting arrangement according to claim 5, wherein:

said joint comprises a first member and a second member;
   said first casing comprises a projection;
   said projection of said first casing is disposed to extend toward said second casing;
   said projection of said first casing is configured to form said first member of said joint;

said first portion of said second casing comprises a projection;

said projection of said first portion of said second casing is disposed to extend toward said first casing;

said second portion of said second casing comprises a projection;

said projection of said second portion of said second casing is disposed to extend toward said first casing;

said projection of said first portion of said second casing and said projection of said second portion of said second casing are configured to together form said second member of said joint; and said second member of said joint is disposed to at least partially enclose said first member of said joint.

7. The shifting arrangement according to claim 6, wherein at least one of: said first casing; said first portion of said second casing; and said second portion of said second casing comprises a plastic material.

8. The shifting arrangement according to claim 7, wherein:

said spring arrangement comprises a first tube and a second tube;

said first tube is at least partially disposed within said second tube;

said first tube is configured and disposed to connect to said coupling device;

said second tube is configured and disposed to connect to said second end of said second pull;

said spring arrangement comprises a spring;

said spring is disposed in said second tube and between said first tube and said second tube;

said spring is configured and disposed to be tensioned by said first tube moving with respect to said second tube upon said control device attempting to shift gears and said shifting device being unable to shift gears; and said spring is configured and disposed to return to a rest position upon said shifting device being able to shift gears.

9. The shifting arrangement according to claim 8, wherein:

said shifting arrangement comprises an attaching member;

said attaching member is disposed on said second casing;

said collar is configured and disposed to hold said first portion of said second casing against said second portion of said second casing;

said shifting device comprises a shifting wheel;

said coupling device comprises a clamping device;

said clamping device is configured and disposed to receive said second end of said first pull;

said coupling device comprises a clamping screw;

said clamping screw is configured and disposed to tighten said second end of said first pull in said clamping device;

said second casing comprises a first end and a second end;

said first end of said second casing is disposed adjacent to said joint;

said second end of said second casing is disposed opposite said first end;

said second casing comprises a threaded portion;

said threaded portion is disposed adjacent to said second end of said second casing;

said shifting arrangement comprises an adjusting screw;

said adjusting screw is configured and disposed to mate with said threaded portion of said second end of said second casing; and said adjusting screw is configured and disposed to support said cover of said cable.

10. A kit for a shifting arrangement of a multigear hub for a bicycle, said kit comprising:

a first casing;

said first casing being configured to be disposed to at least partially cover a shifting device to shift gears;

a second casing;

said second casing being configured to be disposed adjacent to said first casing;

said second casing comprising an opening to receive a cable extending from a control device to control shifting of gears by the shifting device;

a spring arrangement;

said spring arrangement being configured to transmit a force from the control device to the shifting device to shift gears;

said spring arrangement being configured to be disposed in said second casing;

said spring arrangement comprising a first end and a second end;

said first end of said spring arrangement being configured to be disposed to connect to a cable extending from the shifting device;

said second end of said spring arrangement being configured to be disposed opposite said first end of said spring arrangement;

a coupling device;

said coupling device being configured to be disposed to connect an end of at least a portion of the cable extending from the control device with said second end of said spring arrangement;

a joint;

said joint being configured to be disposed to connect said first casing to said second casing; and said joint being configured to be disposed to guide at least a portion of the cable, extending from said first casing to said second casing, through said joint.

11. The kit according to claim 10, wherein:

said kit comprises a collar; and said collar is configured to be disposed to at least partially cover said joint to prevent dirt from entering said joint.

12. The kit according to claim 11, wherein:

said second casing comprises a first portion and a second portion;

said first portion of said second casing is configured to be disposed to form at least one connection with said second portion of said second casing; and said second portion of said second casing is configured to be disposed to form at least one connection with said first portion of said second casing.

13. The kit according to claim 12, wherein:

said joint comprises a first member and a second member;

said first casing comprises a projection;

said projection of said first casing is configured to be disposed to extend toward said second casing;

said projection of said first casing is configured to form said first member of said joint;

said first portion of said second casing comprises a projection;

said projection of said first portion of said second casing is configured to be disposed to extend toward said first casing;

said second portion of said second casing comprises a projection;

said projection of said second portion of said second casing is configured to be disposed to extend toward said first casing;

said projection of said first portion of said second casing and said projection of said second portion of said second casing are configured to together form said second member of said joint; and said second member of said joint is configured to be disposed to at least partially enclose said first member of said joint.

14. The kit according to claim 13, wherein:

said first casing comprises a plastic material;

said first portion of said second casing comprises a plastic material;

said second portion of said second casing comprises a plastic material;

said second casing comprises a threaded portion;

said threaded portion of said second casing is configured to be disposed adjacent to said opening of said second casing;

said kit comprises an adjusting screw;

said adjusting screw is configured to be disposed to connect to said threaded portion of said second casing;

said adjusting screw is configured to be disposed to support a cable cover of the cable entering said opening of said second casing;

said coupling device comprises a clamping device;

said clamping device is configured to be disposed to receive an end of the cable extending from the control device;

said coupling device comprises a clamping screw;

said clamping screw is configured to be disposed to tighten an end of the cable extending from the control device in said clamping device;

said kit comprises an attaching member;

said spring arrangement comprises a first tube and a second tube;

said first tube is configured to be at least partially disposed within said second tube;

said first tube is configured to be disposed to connect with said coupling device;

said second tube is configured to be disposed to connect to an end of the cable extending from said shifting device;

said spring arrangement comprises a spring;

said spring is configured to be disposed in said second tube and between said first tube and said second tube;

said spring is configured to be disposed to be tensioned by said first tube moving with respect to said second tube upon said control device attempting to shift gears and said shifting device being unable to shift gears; and said spring is configured to be disposed to return to a rest position upon said shifting device being able to shift gears.

15. A shifting arrangement for a multigear hub of a bicycle, said shifting arrangement comprising:

a first casing;

said first casing being configured to be disposed to at least partially cover a shifting device to shift gears;

a second casing;

said second casing being disposed adjacent to said first casing;

said second casing comprising an opening to receive a cable extending from a control device to control shifting of gears by said shifting device;

a spring arrangement;

said spring arrangement being configured to transmit a force from said control device to said shifting device to shift gears;

said spring arrangement being disposed in said second casing;

said spring arrangement comprising a first end and a second end;

said first end of said spring arrangement being configured and disposed to connect to at least a portion of the cable extending from said shifting device;

said second end of said spring arrangement being disposed opposite said first end of said spring arrangement;

a coupling device;

said coupling device being configured and disposed to connect an end of at least a portion of the cable extending from said control device with said second end of said spring arrangement;

a joint;

said joint being configured and disposed to connect said first casing to said second casing; and said joint being configured and disposed to guide said cable, extending from said first casing to said second casing, through said joint.

16. The shifting arrangement according to claim 15, wherein:

said shifting arrangement comprises a collar; and said collar is configured and disposed to at least partially cover said joint to prevent dirt from entering said joint.

17. The shifting arrangement according to claim 16, wherein:

said second casing comprises a first portion and a second portion;

said first portion of said second casing is configured and disposed to form at least one connection with said second portion of said second casing; and said second portion of said second casing is configured and disposed to form at least one connection with said first portion of said second casing.

18. The shifting arrangement according to claim 17, wherein:

said joint comprises a first member and a second member;

said first casing comprises a projection;

said projection of said first casing is disposed to extend toward said second casing;

said projection of said first casing is configured to form said first member of said joint;

said first portion of said second casing comprises a projection;

said projection of said first portion of said second casing is disposed to extend toward said first casing;

said second portion of said second casing comprises a projection;

said projection of said second portion of said second casing is disposed to extend toward said first casing;

said projection of said first portion of said second casing and said projection of said second portion of said second casing are configured to together form said second member of said joint; and said second member of said joint is disposed to at least partially enclose said first member of said joint.

19. The shifting arrangement according to claim 18, wherein:

said spring arrangement comprises a first tube and a second tube;

said first tube is at least partially disposed within said second tube;

said first tube is configured and disposed to connect to said coupling device;

said second tube is configured and disposed to connect to an end of said cable extending from said shifting device;

said spring arrangement comprises a spring;

said spring is disposed in said second tube and between said first tube and said second tube;

said spring is configured and disposed to be tensioned by said first tube moving with respect to said second tube upon said control device attempting to shift gears and said shifting device being unable to shift gears; and said spring is configured and disposed to return to a rest position upon said shifting device being able to shift gears.

20. The shifting arrangement according to claim 19, wherein:

said first casing comprises a plastic material;

said first portion of said second casing comprises a plastic material;

said second portion of said second casing comprises a plastic material;

said second casing comprises a threaded portion;

said threaded portion of said second casing is disposed adjacent to said opening of said second casing;

said shifting arrangement comprises an adjusting screw;

said adjusting screw is configured and disposed to connect to said threaded portion of said second casing;

said adjusting screw is configured and disposed to support a cable cover of said cable entering said opening of said second casing;

said coupling device comprises a clamping device;

said clamping device is configured and disposed to receive an end of said cable extending from said control device;

said coupling device comprises a clamping screw;

said clamping screw is configured and disposed to tighten said clamping device around an end of said cable extending from said control device; and said shifting arrangement comprises an attachment member.

\* \* \* \* \*